United States Patent
Ramasastry

[19]
[11] Patent Number: 5,991,345
[45] Date of Patent: *Nov. 23, 1999

[54] METHOD AND APPARATUS FOR DIVERSITY ENHANCEMENT USING PSEUDO-MULTIPATH SIGNALS

[75] Inventor: Jayaram Ramasastry, Potomac, Md.

[73] Assignee: QUALCOMM Incorporated, San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/532,452

[22] Filed: Sep. 22, 1995

[51] Int. Cl.⁶ ............................. H04B 7/10; H04B 1/69
[52] U.S. Cl. .................... 375/347; 375/200; 455/11.1; 455/65; 370/320
[58] Field of Search ................... 375/200, 205, 375/206, 211, 260, 267, 316, 347; 370/18, 104.1, 97, 316, 317, 320, 342; 455/7, 12.1, 52.1, 52.3, 65, 11.1, 13.1, 277.1, 277.2, 133–135

[56] References Cited

U.S. PATENT DOCUMENTS

| | | |
|---|---|---|
| 3,676,778 | 7/1972 | Mori ........................................ 455/12.1 |
| 4,218,654 | 8/1980 | Ogawa et al. . |
| 4,287,598 | 9/1981 | Langseth et al. ....................... 455/12.1 |
| 4,599,734 | 7/1986 | Yamamoto . |
| 4,715,048 | 12/1987 | Masamura . |
| 4,949,268 | 8/1990 | Nishikawa et al. ................... 264/449.1 |
| 5,073,900 | 12/1991 | Mallinckrodt ............................ 375/205 |
| 5,233,626 | 8/1993 | Ames ....................................... 455/12.1 |
| 5,404,568 | 4/1995 | Yamagishi ............................... 455/12.1 |
| 5,490,284 | 2/1996 | Itoh et al. ............................... 455/13.1 |
| 5,583,517 | 12/1996 | Yokev et al. ............................ 342/457 |
| 5,603,091 | 2/1997 | Linquist et al. ........................ 455/56.1 |

FOREIGN PATENT DOCUMENTS

| | | | |
|---|---|---|---|
| 0489661 | 6/1992 | European Pat. Off. ........ H04B 7/185 |
| 0187926 | 8/1988 | Japan ..................... 455/12.1 |
| 4060619 | 3/1994 | Japan ..................... 455/12.1 |
| 9115071 | 10/1991 | WIPO ............................. H04L 27/30 |

*Primary Examiner*—Don N. Vo
*Attorney, Agent, or Firm*—Russell B. Miller; Thomas M. Thibault; Gregory D. Ogrod

[57] ABSTRACT

Method and apparatus for enhancing diversity in spread spectrum type communication systems by creating pseudo-multipath conditions or links for certain communication signals. The invention provides alternative or additional signal paths, for signals being transferred between gateways and communication system users through one or more a satellite repeaters. These additional paths are used to establish and maintain adequate signal diversity as well as certain signal links by remote subscribers in heavy urban areas. In further aspects of the invention, diversity enhancers can employ high gain parabolic antennas and tracking mechanisms, or passive reflective surfaces. Signals can be relayed to subscriber units in canyon type blocked areas or within structures.

7 Claims, 6 Drawing Sheets

FIG. 7

METHOD AND APPARATUS FOR DIVERSITY ENHANCEMENT USING PSEUDO-MULTIPATH SIGNALS

BACKGROUND OF THE INVENTION

I. Field of the Invention

The present invention relates to multiple access communication systems, such as wireless data or telephone systems, and satellite repeater type spread spectrum communication systems. More particularly, the invention relates to a method and apparatus for establishing or maintaining signal diversity and improving signal acquisition for communication system subscribers in an urban environment by producing pseudo-multipath signals and indirect signal paths.

II. Description of the Related Art

A variety of multiple access communication systems have been developed for transferring information among a large number of system users. Techniques employed by such multiple access communication systems include time division multiple access (TDMA), frequency division multiple access (FDMA), and AM modulation schemes, the basics of which are well known in the art. However, spread spectrum modulation techniques, such as code division multiple access (CDMA) spread spectrum techniques, provide significant advantages over other modulation schemes, especially when providing service for a large number of communication system users. The use of CDMA techniques in communication systems is disclosed in the teachings of U.S. Pat. No. 4,901,307, which issued Feb. 13, 1990 under the title "Spread Spectrum Multiple Access Communication System Using Satellite Or Terrestrial Repeaters," and U.S. patent application Ser. No. 08/368,570, filed under the title "Method And Apparatus For Using Full Spectrum Transmitted Power In A Spread Spectrum Communication System For Tracking Individual Recipient Phase Time And Energy," both of which are assigned to the assignee of the present invention, and incorporated herein by reference.

These patents disclose communication systems in which a large number of generally mobile or remote system users or subscriber units employ transceivers to communicate with other system users, or desired signal recipients such as through a public telephone switching network. Communication signals are transferred through satellite repeaters and gateways or terrestrial base stations (also sometimes referred to as cell-sites or cells) using code division multiple access (CDMA) spread spectrum type communication signals.

Using wide band CDMA techniques permits problems such as multipath fading to be more readily overcome, especially for terrestrial repeaters. CDMA signal processing provides a relatively high signal gain which allows spectrally similar communication signals to be more quickly differentiated. This allows signals traversing different propagation paths to be readily distinguished from each other, provided their respective path length differential causes relative propagation delays in excess of the chip period of the spreading code sequence used. Generally path length differentials of approximately 1 microsecond or more are easily distinguished, and typical urban environments provide differential paths delays of 10–20 microseconds.

The ability to discriminate between multipath signals greatly reduces the severity of multipath fading but typically does not totally eliminate it because of occasional paths with very small delay differentials. The existence of low delay paths is more especially true for satellite repeater based communication systems where multipath reflections from buildings and other terrestrial surfaces is reduced. Therefore, it is desirable to provide some form of signal diversity to reduce the deleterious effects of fading and additional problems associated with relative user, or repeater, movement.

Generally, three types of diversity are used in spread spectrum communication systems, and they are time, frequency, and space diversity. Time diversity is obtainable using data repetition, and time interleaving of data or signal components. A form of frequency diversity is inherently provided by CDMA in which the signal energy is spread over a wide bandwidth. Therefore, frequency selective fading affects only a small part of the CDMA signal bandwidth.

Space or path diversity is obtained by providing multiple signal paths through simultaneous links with a mobile or remote user through two or more base stations or antennas, for terrestrial-based repeater systems; or two or more satellite beams or individual satellites, for space-based repeater systems. That is, in the satellite communication environment or for indoor wireless communication systems, path diversity may be obtained by deliberately transmitting or receiving over multiple signal paths using multiple repeaters or transceivers. Furthermore, path diversity may be obtained by exploiting a natural multipath environment by allowing a signal arriving over different paths, each with a different propagation delay, to be received and processed separately for each path.

Examples of using path diversity in multiple access communication systems are illustrated in U.S. Pat. No. 5,101,501 entitled "Soft Handoff In A CDMA Cellular Telephone System," issued Mar. 31, 1992, and U.S. Pat. No. 5,109,390 entitled "Diversity Receiver In A CDMA Cellular Telephone System," issued Apr. 28, 1992, both assigned to the assignee of the present invention, and incorporated herein by reference.

Communication systems using satellites often maintain communication links for a mobile user through two or more satellites at any time to provide robust signal diversity. As disclosed above, such signal diversity helps combat problems with multipath fading which is intensified when operating in heavily industrial or high density urban environments. While signal diversity can overcome much of this problem, the situation is complicated by the fact that only one satellite may be "in view" of a subscriber unit or user in some circumstances.

Many modern urban areas have a large number of multi-story buildings or tall structures that might block signals from being received by or from one or more satellites that are normally "in view" of subscribers, but for the blockage. When these structures are grouped closely together, they form what is often referred to as "urban canyons". It can be seen that such urban canyons, or even single buildings, not only contribute greatly to multipath fading because of reflections, but also severely attenuate or completely block some signal paths to subscriber units. This prevents an appropriate use of multiple satellite beam signal diversity in some situations, greatly degrading system performance relative to certain users. In addition, some canyons might even totally block all direct 'line-of-sight' paths to satellites.

Even when there appears to be a general line-of-sight communication path, there is also the matter of related structural interference. That is, users trying to establish either diversity or direct path communication links also have to deal with interference or severe signal attenuation from building materials when positioned interior to buildings, or from suspended building decorations, etc.

What is needed is a technique or apparatus that maintains or enhances signal diversity in urban environments that are prone to signal blockage. It is also desirable that such a technique require little complexity and control on the part of gateways, and can be directed to reach building interiors as well.

SUMMARY OF THE INVENTION

In view of the above problems encountered in the art, one object of the present invention is to mitigate the effect of signal blockages from physical structures, such as in urban canyons, with the generation of alternate pseudo-multipath signals for maintaining or enhancing signal diversity.

An advantage of the invention is that either single or multiple satellites can be obstructed from subscriber view while maintaining diversity.

Another purpose of the invention is to provide pseudo multipath signals for a single satellite link when no other satellite is in view.

Other advantages of the invention include the ability to improve signal to noise ratio of transferred signals, to provide signal penetration of buildings, and, in some cases, actually direct signals to a desired location.

These and other purposes, advantages, and objects are realized in a method and apparatus, for enhancing signal diversity in a spread spectrum communication system in which communication signals are transferred to one or more system subscribers using at least one satellite. Such spread spectrum communication signals are generally susceptible to multipath propagation and transfer discontinuities or periods of reception interruption due to the presence of physical signal blocking entities.

Blocking entities are structures, such as buildings forming urban canyons, or geographic features, located in positions along line-of-sight signal transfer paths generally between subscribers and satellites for certain orbital positions of the satellites. That is, depending on the location and angle of each satellite in an orbit relative to subscribers and local structures, signal transfer may be severely attenuated or completely interrupted for subscribers located near or among signal blocking entities. Subscribers often can not maintain an adequate communications link due to a lack of signal path diversity in this situation. In addition, some buildings severely attenuate or interrupt signals for subscribers located interior of buildings.

Using the invention, communication signals are received from one or more satellites and re-transmitted using a signal redirection device which is positioned relative to signal blocking entities so that it can re-transmit signals to subscribers regardless of the presence of such entities. Signals are retransmitted to subscribers having blocked signal reception during periods of reception interruption. The signal redirection device uses at least one antenna configured to receive communication signals from at least one satellite and which is positioned relative to signal blocking entities so as to be able to transmit signals to blocked subscribers.

A signal transfer device such as an appropriately configured and tuned transceiver, or receiver and transmitter combination, is connected to the antenna for receiving signals, providing a predetermined amount of amplification, and re-transmitting the signals. Typically, an amplification factor of unity or less is used, but in some configurations an amplification factor sufficient to provide a positive signal to noise ratio for re-transmitted signals is used.

Preferably, at least two antennas are used, with one operating as a receiving antenna and the other as a transmitting antenna and the signal transfer circuit is connected in series between them. Generally, a steerable directional antenna is used for the receiving antenna and an omnidirectional antenna for the subscriber re-transmission antenna. In preferred embodiments, one or more additional steerable directional antennas are used to accommodate multiple satellites and handoff between satellites. Steering mechanisms connected to the directional antennas allow the antennas to be guided to appropriate positions for blocked satellite communication signals and to track satellites in orbit.

The omnidirectional antenna also operates to receive subscriber generated signals while the directional antenna re-transmits them to satellites. However, in some embodiments one or more directional antennas are used by the signal transfer device to transfer signals to and from subscriber units located within preselected clearly defined areas. These antennas can be fixed to cover preselected areas, or use a pointing device to be redirected among multiple predefined regions, based on current operating conditions.

The redirection device, or signal transfer circuitry, is located on a tall building or an elevated geographic formation. However, the device can be placed in a variety of locations as long as the subscriber re-transmission antenna is located with an unobstructed transmission path for blocked subscribers to be provided with service, and there are no obstructions for the satellite reception antennas. Along this line, subscriber reception and retransmission antennas, can be located on multiple buildings or elevated locations and serviced by one central transfer circuit.

As discussed above, communication signals can be received from a single or from multiple satellites. The signals can be re-transmitted or relayed from one satellite to maintain a signal diversity path with signals being received by a subscriber from another, unblocked, satellite. Alternatively, signals from a single satellite can be received and delayed, using a delay element that imposes a few microseconds of delay, in the redirection device, to generate a second diversity signal path.

In an alternative embodiment, the signal redirection device comprises at least one passive signal reflector with a shaped, generally arcuate, surface positioned relative to signal blocking entities so as to receive communication signals from satellites in certain orbital positions, and reflect them to subscribers having blocked reception.

BRIEF DESCRIPTION OF THE DRAWINGS

The features, objects, and advantages of the present invention will become more apparent from the detailed descriptions set forth below when taken in conjunction with the drawings in which like reference characters identify correspondingly throughout and wherein.

DETAILED DESCRIPTION OF THE PREFERRED EMBODIMENT

The present invention provides a technique for enhancing signal diversity performance of spread spectrum communication systems by creating pseudo-multipath conditions or links for certain communication signals. The invention provides alternative or additional signal paths for signals being transferred between gateways and communication system users through one or more satellites. These additional paths are used to establish and maintain adequate signal diversity as well as certain signal links by remote subscribers in heavy urban areas.

Figure 1:
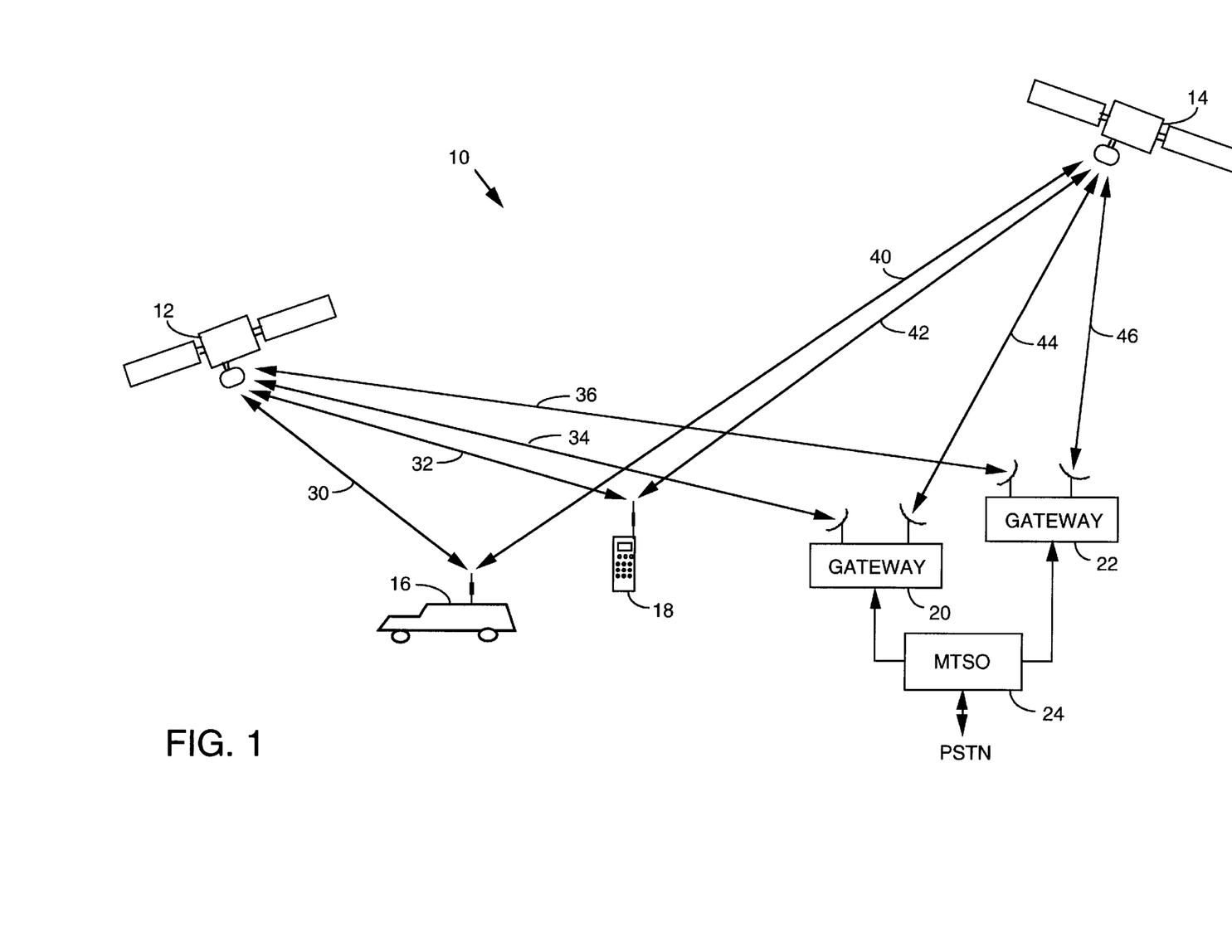
FIG. 1 illustrates an overview of a wireless spread spectrum communication system using satellite repeaters.

An exemplary wireless communication system, such as a wireless telephone system, in which the present invention is used is illustrated in FIG. 1. The communication system 10 illustrated in FIG. 1 uses spread spectrum modulation techniques in communicating between communication system remote or mobile subscriber units and system gateways or base stations. Satellite repeaters are typically used in a communication system to service more users per repeater but distributed over larger geographical regions than traditional cellular telephone type systems. Because of the large areas often serviced, a satellite can have a relatively low elevation angle relative to some subscribers.

In the portion of the communication system illustrated in FIG. 1, two exemplary satellites 12 and 14, and two associated gateways or hubs 20 and 22 are shown for effecting communications with two exemplary remote subscriber units 16 and 18. Subscriber units 16 and 18 each have or comprise a wireless communication device such as, but not limited to, a cellular telephone. Such units are typically either hand-held or vehicle mounted as desired. Here, subscriber unit 18 is illustrated as a portable handheld telephone. While these subscriber units are discussed as being mobile, it is also understood that the teachings of the invention are applicable to fixed units where remote wireless service is desired. In addition, the wireless service can be provided for structural interior areas as well as 'open air' locations as discussed further below.

It is contemplated for this example that satellites 12 and 14 provide multiple beams that are directed to cover separate generally non-overlapping geographic regions. However, it is readily understood that the beam coverage or service areas for different satellites, or antenna patterns for terrestrial cellsites, may overlap completely or partially in a given region depending on the communication system design and the type of service being offered, and space diversity may also be achieved between any of these communication regions or devices.

In FIG. 1, some possible signal paths are illustrated for communications being established through satellites 12 and 14 between subscriber units 16 and 18 and one or more gateways or centralized hubs 20 and 22. The satellite-user portions of communication links between gateway 20 and subscriber units 16 and 18 are illustrated by lines 30 and 32, respectively. The arrowheads on these lines illustrate exemplary signal directions for each communication link, as being either a forward or a reverse link, and are present only for purposes of clarity and not as indicating any actual signal patterns or physical restrictions. In a similar manner, possible communication links between gateway 22 and subscriber units 16 and 18, are illustrated by lines 40 and 42, respectively. The gateway-satellite portions of these communication links are illustrated by a series of lines 34, 36, 44, and 46.

As seen in FIG. 1, communication system 10 generally uses a system controller and switch network 24, also referred to as mobile telephone switching office (MTSO). MTSO 24 typically includes interface and processing circuitry for providing system-wide control for gateways or base stations, and to control routing of telephone calls between a public switched telephone network (PSTN) and gateways, and subscriber units. The communication link that couples controller 24 to various system gateways or base stations can be established using known techniques such as, but not limited to, dedicated telephone lines, optical fiber links, or microwave or dedicated satellite communication links.

While only two satellites are illustrated in FIG. 1, the communication system generally employs multiple satellites 12 and 14 traversing different orbital planes. A variety of multi-satellite communication systems have been proposed with an exemplary system employing on the order of 48 or more satellites, traveling in eight different orbital planes in Low Earth Orbit (LEO) for servicing a large number of subscriber units. However, those skilled in the art will readily understand how the teachings of the present invention are applicable to a variety of satellite system and gateway configurations, including other orbital distances and constellations.

The satellites in such a system, including satellites 12 and 14, project beams in spots that move over the Earth's surface in accordance with satellite motion. The beams pass through or are positioned over various rural and urban centers. Typically, system subscribers may utilize signal paths through satellites 12 and 14 when they are elevated anywhere from 10 degrees or more above a horizon measured relative to the subscriber seeking communication service. The angle at which useful communication occurs is, however, dependent upon whether or not there are obstructive or attenuating objects in the path. For example, buildings or dense foliage may substantially increase the angle needed before communication can occur.

As previously discussed, tall buildings and various structures typically found in highly populated urban environments tend to form large barriers to signal passage which combine to form terrestrial features referred to as "urban canyons". However, even in some less densely populated areas a number of structures can still combine to decrease signal passage, or certain geological barriers can form natural canyons. The negative impact that such structures have on communication is illustrated in further detail in FIG. 2 where a series of subscriber units or user terminals 18A, 18B, and 18C are shown positioned within or among structures forming such urban canyons. Satellites 12 and 14 attempt to establish or maintain communication links with these subscriber units, and provide signal diversity, as they pass overhead.

Figure 2:
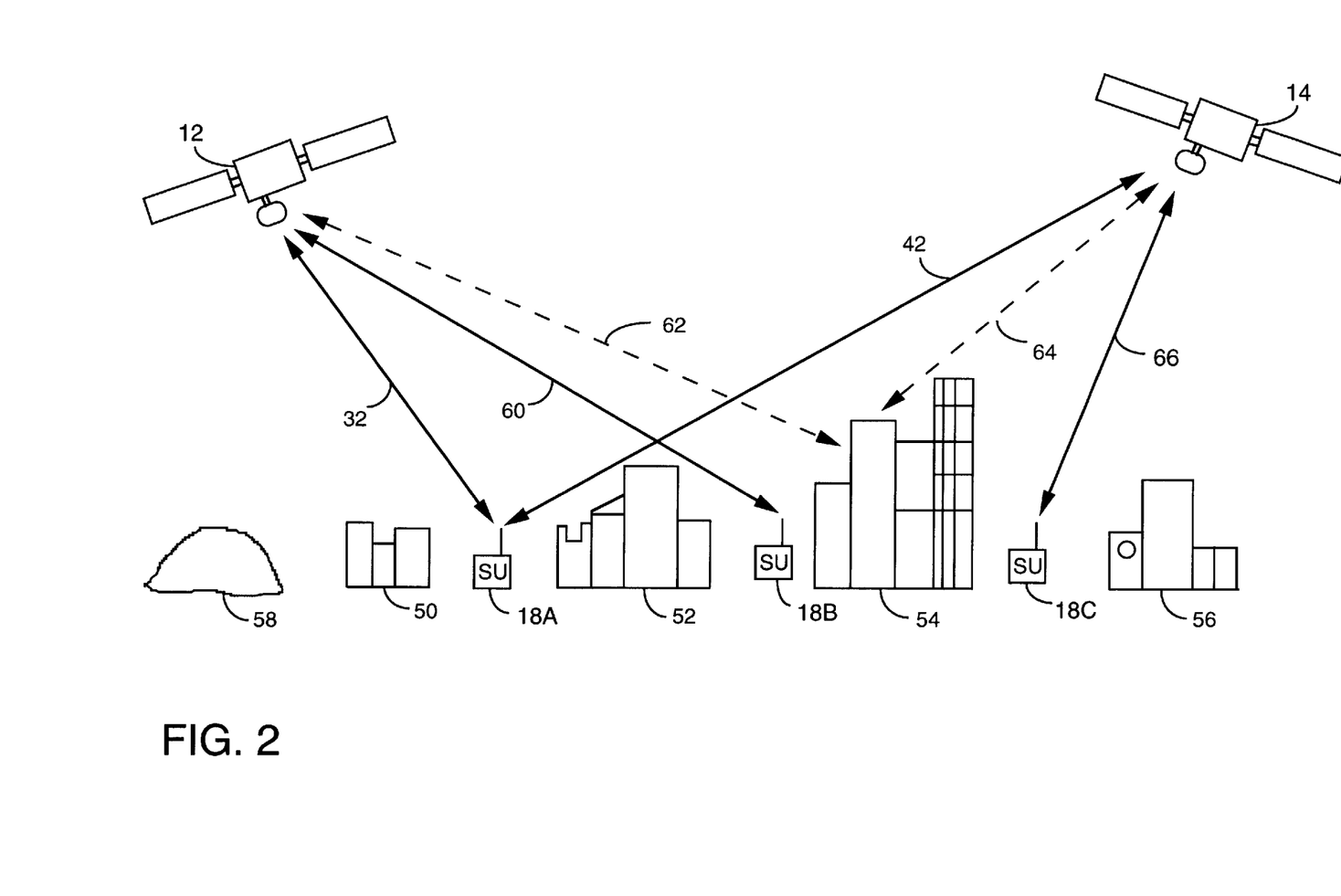
FIG. 2 illustrates a portion the communication system of FIG. 1 being used for subscriber units in an urban area.

In FIG. 2, structures or structure sets or clusters 50, 52, 54, and 56 are presented in the form of a cross section of a large metropolitan area where a variety of such structures in the form of tall buildings are positioned along various streets subscriber units might use. However, any variety of tall structures, such as transmission towers, advertising signs, water storage facilities, and the like can form blocking or attenuating structures. In addition, a geological formation such as hill or plateau 58 is included as a potential contributor to signal blockage. The two satellites are shown in exemplary positions in their respective orbital planes relative to the subscriber units at one point in time, with the scale being exaggerated for purposes of illustration.

It will be readily apparent to those skilled in the art that as the satellites traverse their respective orbits and transit from horizon-to-horizon the view presented in FIG. 2 will change and signals will periodically be able to reach different users or subscriber units as different structures occasionally block or no longer block signals. This may include some subscriber units being blocked from communicating directly with either, or any, satellite at some times. For convenience only, the remaining discussion only shows one satellite being shielded or having signals blocked in relation to particular subscribers.

Possible communication paths between satellite 12 and subscriber units 18A, 18B, 18C are indicated in FIG. 2 by lines 32, 60, and 62, respectively, while lines 42, 64, and 66 indicate possible communication paths between satellite 14 and users 18A, 18B, 18C, respectively. As shown in FIG. 2, paths 32 and 60 indicate direct uninhibited communication paths from satellite 12 while path 62 is interrupted or blocked by structures or structure set 54. In this example, there is no direct communication path from satellite 12 to user 18C. At the same time, paths 42 and 66 indicate direct uninhibited communication paths from satellite 14 while path 64 is interrupted or blocked by structures 54. When the satellites are positioned as shown, subscriber unit 18C does not receive signals from satellite 12 while subscriber unit 18B does not receive signals from satellite 14.

Therefore, to maintain the ability to service communication links and provide desired signal diversity to counter the effects of fading resulting from satellite motion and multipath surface reflections, a new diversity enhancement apparatus or device has been developed. Diversity enhancement is provided by establishing a pseudo-multipath communication link between subscriber units and one or more satellites. The pseudo multipath signals provide indirect communication paths for transferring otherwise obscured signals into canyons or areas of blockage. The transferred signals are presented along paths that are line-of-sight trajectories into the blocked areas. This new technique is illustrated beginning in FIG. 3 where diversity enhancers are shown being used in the communication system of FIG. 1.

Figure 3:
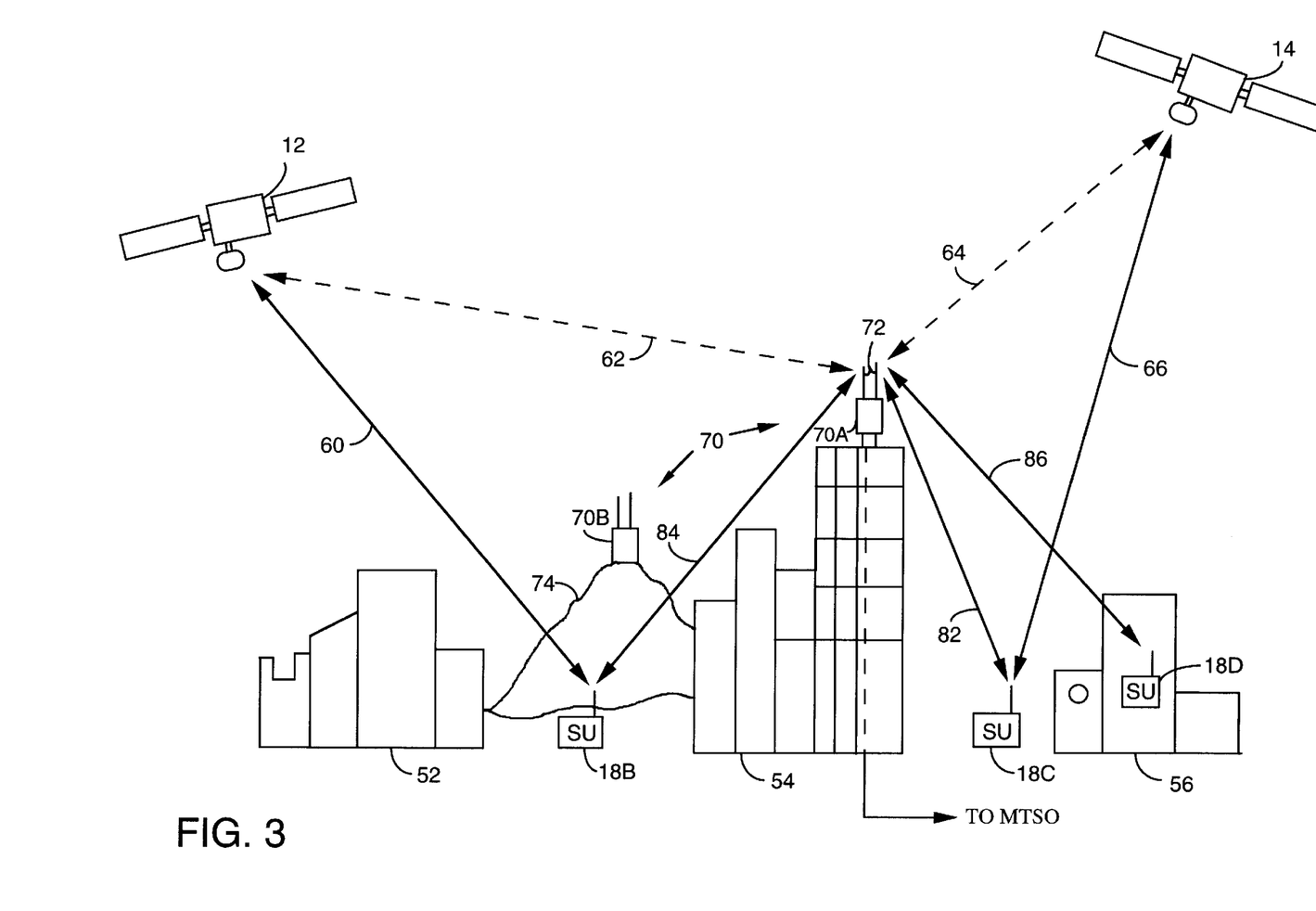
FIG. 3 illustrates a more detailed view of a portion of the communication system shown in FIG. 2 using a diversity enhancing apparatus constructed and operating according to the principles of the present invention.

In FIG. 3, structure sets 52, 54, and 56 are again shown interacting with signals from satellites 12 and 14 which are intended for a set of users 18B, 18C, and 18D. In this example, subscriber units 18B and 18C are positioned within the areas between structures, while subscriber unit 18D is actually positioned interior to one of the structures forming structure set 56. Direct communication signal paths 60 and 66 are shown as before, along with blocked or severely attenuated signal paths 62 and 64. However, signals 62 and 64 are now received by a diversity enhancer or repeater 70, here 70A, and transferred to subscriber units 18C and 18B over signal paths 82 and 84, respectively. That is, signal 62 from satellite 12 is received and transferred to subscriber unit 18C as new indirect signal 82, while signals on path 64 from satellite 14 are received and transferred to subscriber unit 18B over new indirect signal path 84. In addition, signals from satellites 12 and 14 can be transferred from signal diversity enhancer 70A to subscriber unit 18D over path 86, with a desired signal gain. Using the diversity enhancer allows signals that are blocked as direct 'line-of-sight' type communication signals to be transferred along an altered path that can be received by targeted subscriber units.

Diversity enhancer 70A is shown positioned on top of a tall building or structure in structure set 54 and having two generally omnidirectional antennas 72. This location allows signals to penetrate into the canyons or blockage regions on either side of the building. However, a variety of installation locations are possible for a diversity enhancer depending on the shape and sizes of various buildings in the area being serviced. Additional diversity enhancers 70 may be required in structure set 54 or on adjacent structures in order to provide a desired level of service to given blockage areas. Structures can be adjacent to or offset from the urban canyon being provided with service, such as at the end of a street.

Alternatively, a diversity enhancer 70B could be positioned on a significantly high geological formation such as a hill, plateau, mountain, or similar formation that is bordered by the structures that create the urban canyons, or is located adjacent to the metropolitan or urban area having the canyons. This is shown in FIG. 3 where a diversity enhancer 70B is located on a hill 74. It is well known that some urbanized regions are positioned immediately adjacent to, or surround, tall mountains or elevated land areas that have direct line-of-sight paths into nearby urban canyons or streets.

It will also be understood by those skilled in the art that diversity enhancers need not always be positioned on top of blocking structures, but could be located on shorter structures, provided there is a desired line-of-sight access for satellites and direct transmissions into a blockage area. This is shown in FIG. 4 where structures 56 have a diversity enhancer 70D located on top.

While diversity enhancers 70A and 70B might employ a single omnidirectional antenna 72, it is preferable to use two or more antennas as shown in FIG. 3. This allows the use of separate antennas for receiving and transmitting communication signals which can provide lower enhancer complexity, for switching antenna functions, and a higher signal capacity. The use of additional antennas and associated transmission and reception circuitry is also useful where uplink and downlink communication signals use different frequency bands. In some systems, more than two antennas may be used to increase transfer capacity or transfer rates. It will be readily understood by those skilled in the art that antennas 72 can be positioned or mounted in a variety of locations about a structure or on separate structures from each other when multiple antennas are used, while being serviced by one diversity enhancer or repeater.

When an omni-directional antenna is used, it generally uses a reasonably high-gain element having its gain optimized in the azimuth and elevation planes of the satellite orbits. It is advantageous to use an antenna that provides sufficient gain to overcome the signal attenuation or losses that occur at the higher frequencies at which advanced communication systems operate. For example, in a system operating at around 2.5 GHz signal-to-noise can approach around −15 dB or more. Therefore, it is more advantageous to utilize a higher gain antenna element such as a narrow beam dish or parabolic antenna structure for communication links between diversity enhancers and satellites. This is shown in FIG. 4 where two diversity enhancers 70C and 70D provide diversity type communication service to subscriber units 18C and 18D over signal paths 92 and 96, and 98 and 99, respectively.

Figure 4:
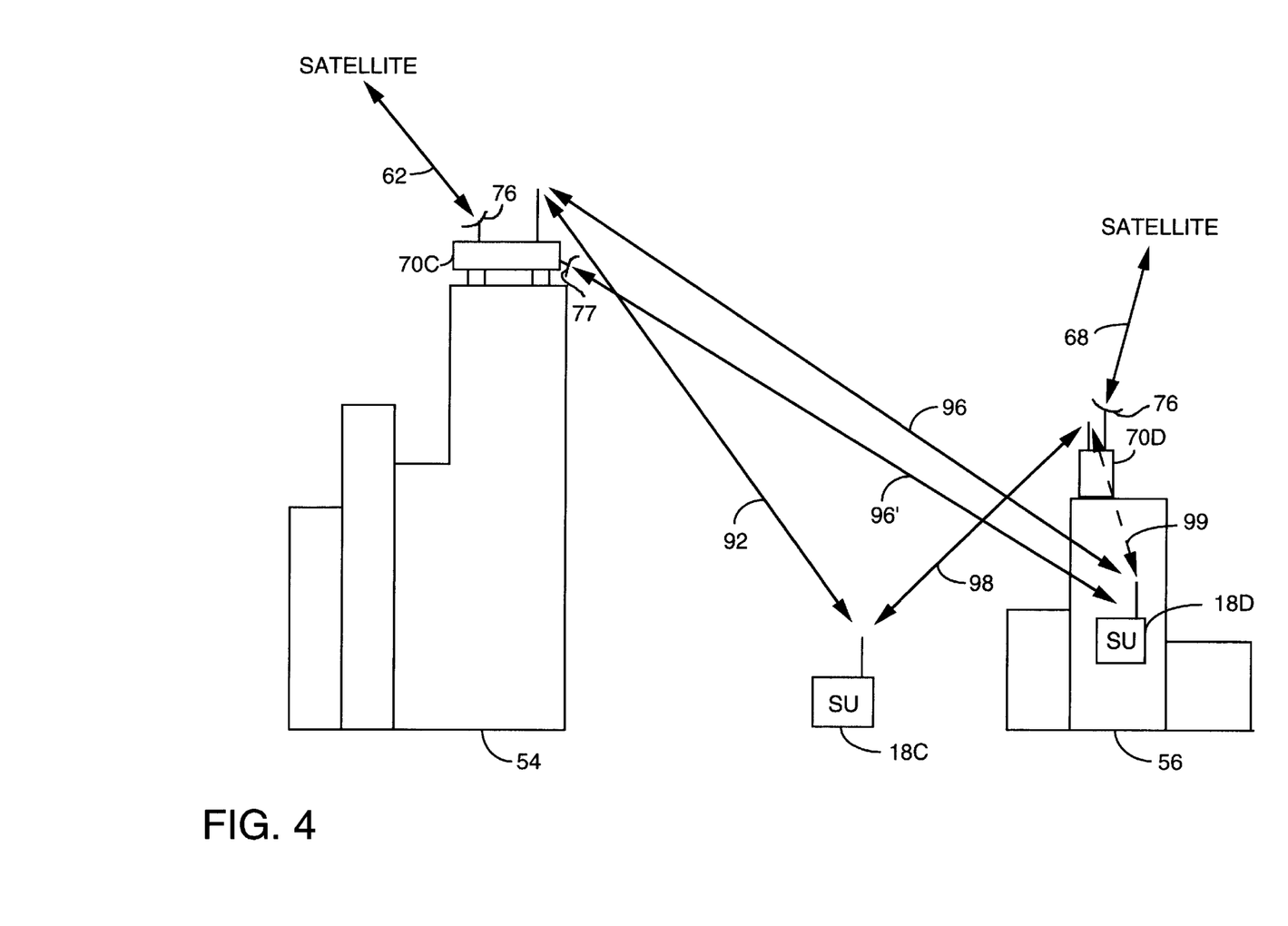
FIG. 4 illustrates a more detailed view of two diversity enhancing apparatus being used to maintain communications in the system of FIG. 1.

In FIG. 4, diversity enhancers 70C and 70D, on structures 54 and 56, each use a directional antenna 76 to provide for higher gain satellite signal transfer. That is, a directional or focused antenna element provides for increased gain to achieve a significantly positive signal-to-noise ratio for signals being transferred to enhancers 70C and 70D by each satellite. Such antennas and their construction and use are well known in the art. For example, an antenna that would provide about a 20 dB gain value when operating at 2.5 GHz would be about 0.5 meters in diameter. While only one such steerable high gain antenna is shown in FIG. 4 for use in satellite signal transfer, it will be readily apparent that two or more such elements may be used in order to accommodate signals from two or more satellites at once and provide for efficient satellite or beam handoff. That is, to provide for transfer of communication links between satellites without interruption.

At the same time one or more directional antennas 77 can also be used to transfer signals to and from subscriber units located within preselected clearly defined areas. An exemplary communication signal path 96' is shown in FIG. 4. Such antennas can be used to achieve a variety of functions, such as to overcome the effects of severe path loss in certain areas, or to minimize adjacent area interference where a significant amount of continual traffic is expected in certain areas. These antennas can be mounted to point along fixed paths to cover preselected areas, or they can be mounted using pointing devices (79 below) so that they can be redirected among multiple predefined regions, as desired, based on current operating conditions.

A driving or pointing mechanism (78 below) coupled to a tracking element or control device is used with high gain antenna element 76 to allow the antenna to point at or direct signals to and from desired satellites. Tracking control is easily provided by understanding that satellites in communication system 10, or any satellite repeater based communication system, traverse substantially fixed flight paths in set orbital planes at preselected velocities. The location of each diversity enhancer is certainly known in advance relative to various satellite trajectories over an urban region of interest. Therefore, information regarding satellite positions relative to reference points on the Earth's surface, and diversity enhancers, at any given time, can be stored or otherwise programmed into a control device well in advance. Techniques for determining relative satellite positions are well known in the art and not discussed further here. In addition, processes for calculating satellite positions at any given time can be stored and implemented when positions are desired.

Figure 5:
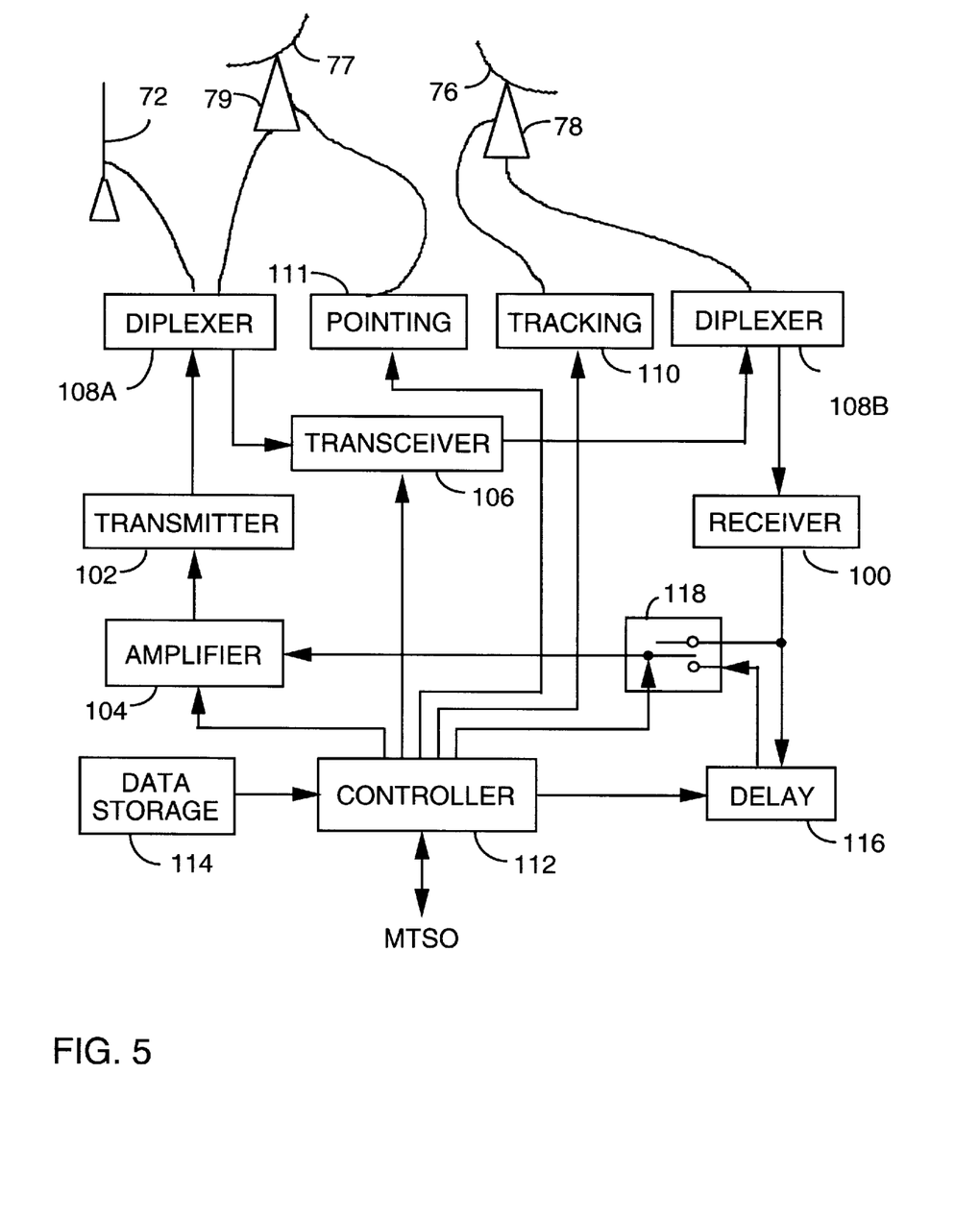
FIG. 5 illustrates a vertical view of a portion of the communication system shown in FIG. 2.

The use of a tracking or pointing systems and general communication signal processing for a diversity enhancer are illustrated in FIG. 5. A portion of a diversity enhancer (70C or 70D) is shown in FIG. 5 along with an omnidirectional antenna 72, and directional or steerable antennas 76 and 77. In FIG. 5, diversity enhancer 70 receives signals from satellites using an antenna and a receiver 100. The signals are subsequently transferred to a transmitter 102 for re-transmission to subscriber units using antennas 72, or 77. As discussed above, received signals can be amplified before re-transmission. Therefore, an amplification stage 104 is shown connected between the output of receiver 100 and an input of transmitter 102. However, signals are generally re-transmitted with as low a power as necessary to effect communication in order to minimize communication system interference. This means that the amplification factor is generally low and approaches unity or less in many cases. Receiver 100, transmitter 102, and amplifier 104 are generally implemented as a single transceiver circuit, as well known in the art, but can be manufactured as distributed elements and are shown that way here for purposes of clarity in illustration.

Signals received from subscriber units are transferred from antenna elements 72, or 77, to as transceiver 106 where they are amplified or filtered as desired and transferred to antenna element 76 for transmission to satellites. A pair of diplexer elements 108A and 108B are typically used to split or segregate received and transmitted signals for the antenna elements. Transceiver 106 could be subdivided into separate functional elements as desired.

A tracking device or position controller 110 is connected to tracking or position motors and drive mechanisms 78 on antenna 76, and serves to provide appropriate control, command, or power signals to such mechanisms for moving the antenna to desired positions. A pointing device or position controller 111 can be connected to position motors and drive mechanisms 79 associated with antenna 77, and provides appropriate control, command, or power signals to such mechanisms for adjusting or moving antenna 77 to desired positions. Such drive mechanisms and control elements are well known in the art and not described here in detail.

A diversity enhancer controller 112 can be used to set amplification levels or factors for amplifier 104 and transceiver 106 as well as provide coordinates or similar position information for tracking device 110. An exemplary controller 112 comprises a microprocessor, memory elements, and interface circuitry. Controller 112 uses and can respond to commands and control signals well known in the art.

A memory or data storage element 114, such as in the form of a look up table that contains elevation and/or directional coordinates indexed as a function of time and satellite identification. Time values can then be used to address the table to select appropriate elevation and directional coordinates for antenna element 76. One or more outputs would be connected to controller 112 or to provide data directly to tracking controller 110. Such information or operating positions can be pre-stored for multiple satellites and recalled as desired by controller 112. Since the diversity enhancer is designed to assist satellites experiencing blockage, the specific satellites traveling over the targeted urban environment and the positions at which blockage is expected can be easily determined in advance by communication system designers. In addition, as shown in FIG. 3, diversity enhancers 70 (70A and 70B) may also be connected to MTSO 24 using techniques discussed above in relation to the gateways. This provides a central control function and communication link that allows a periodic or continual update of position data and control commands for enhancers 70 as desired.

While diversity enhancers 70 can be employed to redirect signals from a satellite to maintain or create space diversity for improved communications, it can also be used to replace a damaged or missing satellite. That is, if for some reason no signal is being received from a satellite, for example satellite 12, then a diversity enhancer 70 can be used to create a pseudo-multipath signal from satellite 14 for subscriber units, regardless of whether satellite 14 has a clear line of sight transfer path available. For this mode of operation, a delay element 116 is used to provide a predetermined amount of delay, on the order of 1 chip time or more for the signal spreading code or function (typically on the order of 1 $\mu$s) to received signals which are then re-transmitted. In this manner a subscriber unit will receive two signals useful for signal diversity reception. Such a delay can also be beneficial to signals being transmitted to overcome structural blockage.

The amount of delay used can vary according to each communication system design, as will be apparent to those skilled in the art, and could be made either fixed, such as a "hardwired" or selected at a point of initialization; or made dynamically adjustable. Controller 112 can provide commands to set the amount of delay which could be changed for different satellites and positions, or adjusted according to system wide parameters through commands received from MTSO 24.

This delay can also be beneficial to signals being transmitted to overcome structural blockage. If one or more satellites come into view or reach a point in their orbital transits for which signals are no longer blocked for a subscriber unit, then the delayed signals from diversity enhancer 70 will not interfere with the direct signals. Such signals are viewed as typical multipath signals which spread spectrum systems can readily distinguish and process. In some communication systems, different timing delay values could be used among various diversity enhancers 70, as desired, to also assist in distinguishing signals arriving from different enhancers.

When a subscriber unit enters an urban canyon or other area of signal blockage, it automatically detects signals available in that area as provided by diversity enhancers servicing that area. The subscriber unit does not need to know the intermediate signal source, enhancer 70, as opposed to the initial source, satellite. It simply scans for the strongest signal, or one appropriate to the desired communication link regardless of its source, and pseudo multipath signals are usable when detected by the subscriber. Reception is determined by communication system timing, frequency, etc., in the same manner direct satellite signals are used.

Figure 6:
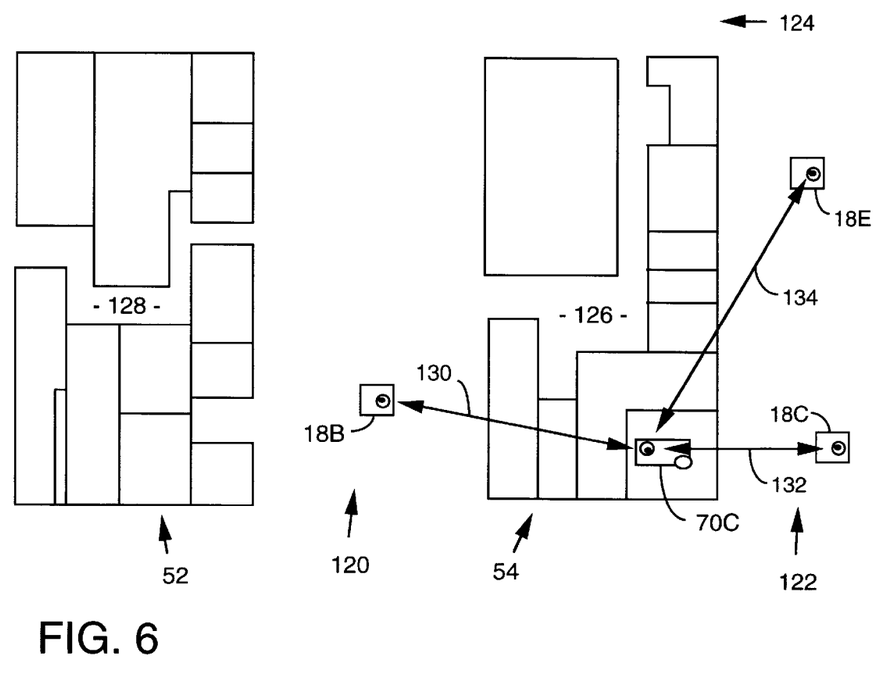
FIG. 6 illustrates the use of a passive reflector type diversity enhancement apparatus.

The example of FIGS. 3 and 4 shows one signal being transferred into each of two urban canyons to single users. Those skilled in the art will readily appreciate that the teachings of the invention apply to multiple communication signals intended for multiple subscriber units in the same blockage area or to single signals intended for multiple users, such as paging and broadcast type signals. This is illustrated in an overhead or top plan view of building sets 52 and 54 in FIG. 6. In FIG. 6, building sets 52 and 54 are positioned along streets or passageways 120, 122, and 124, and have alleys or connection passages 126 and 128 running between portions of these streets. Diversity enhancer 70C is shown providing signals or communication links along signal paths 130, 132, and 134 for subscriber units 18B, 18C, and 18E, respectively.

As discussed above, diversity enhancers can be designed with any desirable level of amplification, subject to known communication system design constraints and desired interference levels. Because a diversity enhancer can increase the power or energy level of a signal, it can also be used to penetrate deeper or more efficiently into structures where subscriber units might be located. This is illustrated in FIGS. 3 and 4, where a subscriber unit 18D is located within a set of buildings 56. Normal signal reception for this subscriber unit is either blocked or at least partially inhibited by the materials forming buildings 56, depending on relative satellite angles etc. However, with increased power being applied to re-transmitted signals, signals traversing a path 96 from diversity enhancer 70C (86 from 70a) and path 99 from diversity enhancer 70D are more likely to provide adequate communications for subscriber unit 18D. This is true for signals arriving either over blocked path 62 and indirect path 96, or more directly over path 68, where the upper portion of a building or similar structure could severely degrade communication.

Figure 7:
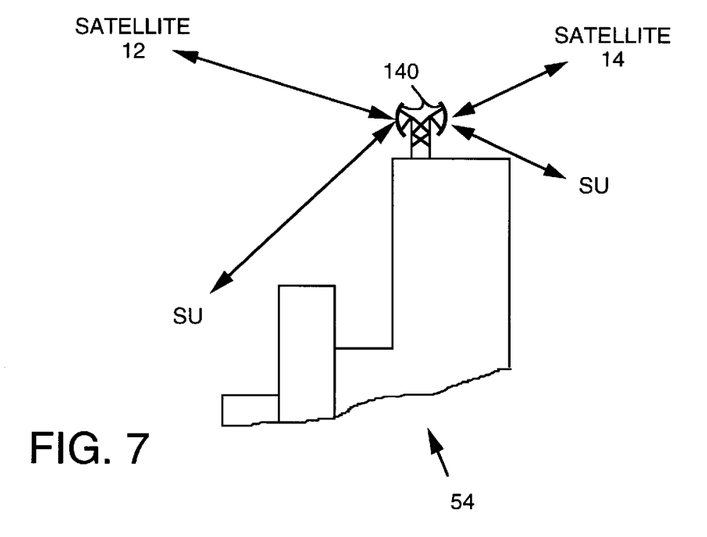
FIG. 7 illustrates the general structure of a diversity enhancement apparatus constructed and operating according to the principles of the present invention.

The above description uses an active repeater structure for diversity enhancers 70A, 70B, 70C, and 70D. However, a passive structure could also be used in some communication system configurations. Such a passive diversity enhancer is illustrated in FIG. 7. In FIG. 7, a passive reflector type of enhancer is shown positioned on top of structures 54 as before. Here one or more reflective elements 140 are positioned to receive and reflect signals into the urban canyons or areas of blockage. Again, the satellite trajectories or orbital patterns are well known for any given communication system, as is the local structural and geological pattern for a given reception area. Therefore, reflective elements can be designed using techniques known in the art, for the angles at which satellites will not be able to effectively transfer signals into certain areas.

By generating pseudo-multipath signals, the present invention enhances path diversity in a communication system which results in improved signal reception and communication. Instead of avoiding multipath signals it actually generates and uses pseudo-multipath signals to enhance path diversity. In addition, the present invention is capable of overcoming temporary loss of satellites in satellite repeater communication systems, and decrease the impact of signal attenuation for building interiors.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What I claim as my invention is:

1. Apparatus for providing signal diversity in a spread spectrum communication system, comprising:

at least one source for transmitting a CDMA communication signal;

at least one diversity enhancer, each for generating at least one pseudo-multipath signal from said source; and a subscriber unit in diversity reception directly with said at least one source and with said at least one diversity enhancer.

2. Apparatus of claim 1 wherein said at least one source for transmitting a CDMA communication signal comprises at least one satellite.

3. Apparatus of claim 1 wherein said at least one source for transmitting a CDMA communication signal comprises at least one terrestrial-based repeater.

4. Apparatus of claim 1 wherein said at least one diversity enhancer comprises:

means for receiving said communication signal from said at least one source;

means for immediately transmitting said CDMA communication signal to said subscriber unit;

means for delaying said communication signal by a predetermined amount of delay; and means for transmitting said delayed CDMA communication signal to said subscriber unit.

5. Apparatus of claim 4 wherein said predetermined amount of delay is substantially equal to a spreading code chip period.

6. Apparatus of claim 4 further comprising a controller for dynamically adjusting said predetermined amount of delay.

7. Method for providing signal diversity in a spread spectrum communication system, comprising the step of:

transmitting a CDMA communication signal by at least one source;

receiving said CDMA communication signal by at least one diversity enhancer and transmitting said CDMA communication signal to a subscriber unit capable of diversity mode reception to provide at least one psuedo-multipath signal to said subscriber unit; and receiving said CDMA communication signal directly from said at least one source and from said diversity enhancer, said CDMA communication signal from said diversity enhancer being received at a time later than said CDMA communication signal from said at least one source.

* * * * *